United States Patent [19]

Morrison

[11] Patent Number: 5,050,911
[45] Date of Patent: Sep. 24, 1991

[54] BREAKAWAY COUPLING

[75] Inventor: Donald L. Morrison, Anaheim, Calif.

[73] Assignee: Kaiser Aerospace & Electronics Corporation, Foster City, Calif.

[21] Appl. No.: 461,240

[22] Filed: Jan. 5, 1990

[51] Int. Cl.$^5$ ............................................. F16L 35/00
[52] U.S. Cl. ..................................... 285/2; 285/175; 285/321
[58] Field of Search .................. 285/2, 3, 4, 175, 321

[56] References Cited

U.S. PATENT DOCUMENTS

| | | | |
|---|---|---|---|
| 3,236,543 | 2/1966 | Mueller | 285/423 X |
| 4,059,288 | 11/1977 | Mohr | 285/2 |
| 4,448,447 | 5/1984 | Funk et al. | 285/4 |
| 4,854,338 | 8/1989 | Grantham | 285/4 X |

*Primary Examiner*—Dave W. Arola
*Attorney, Agent, or Firm*—Marvin H. Kleinberg

[57] ABSTRACT

A coupling device includes male and female telescoping members that are inserted into a fluid carrying hose or conduit. The coupling device includes an O-ring for providing fluid tight seal and a frangible locking ring that will separate when oppositely directed forces exceed a predetermined threshold. The locking ring includes a split so that it can be compressed to a smaller diameter for installation and, in the preferred embodiment, a plurality of frangible radial tabs. In an alternative embodiment, the ring may have a radially extending flange with a parting groove at the juncture of the ring and flange. One of the coupling device members includes a groove that holds the ring and the other member includes a groove that receives the radial tabs or flange.

6 Claims, 2 Drawing Sheets

BREAKAWAY COUPLING

The present invention relates to apparatus for fluid transfer and, more particularly, apparatus to permit controlled breakaway of a connected fluid line when subjected to strains in excess of a predetermined value.

In many fluid delivery systems, fluids under pressure are transferred using conduits that include locked fittings at either end. The conduits or hoses must withstand the maximum pressures of the fluids being transferred and frequently have a tensile strength that far exceeds the breaking strength of the fixtures to which they are attached. For example, aircraft structures may fail at forces that are substantially below the parting strength of a flexible hose that is coupled to the aircraft.

Typical fluid delivery systems include the various systems for supplying fluids under pressure to aircraft. For example, servicing lavatories on an aircraft include the step of flushing and rinsing the waste tanks, utilizing a tank truck and a pump to provide rinsing fluid under pressure, usually around 50 lbs. per square inch (psi).

A flexible hose is employed with fluid tight fittings at both ends of the hose which engage complementary fittings on the aircraft and the tank truck. Because the hose has to carry fluids under pressure, the hose itself is quite strong and can withstand substantial tension in the axial direction.

Normally, the fitting at the aircraft is disengaged before the service truck is driven away, but experience has taught that the normal procedure is not always followed. In those instances when the hose is not disengaged, the pull on the hose is generally withstood by the hose and, as a result, tends to shear off the fitting on the aircraft, inflicting substantial damage to the area in the vicinity of the fitting.

Similar problems could also be encountered in refueling operations if a fuel truck is used. Any movement of the aircraft or the fuel truck before the hose has been disengaged from the aircraft usually results in substantial structural damage to the aircraft, rather than the hose.

Prior art patents have addressed the problem with at least two basic approaches. A first, utilizing frangible members is exemplified in the early patent to H. B. Walker, U.S. Pat. No. 1,243,364, in which a breakaway coupling member was provided for a pipe string used as a well casing. A short pipe section was threaded at one end and had a threaded collar at the opposite end that was joined to the pipe section by radial shear pins that would fail under axial tension. The patent to Kenneth L. Collins, U.S. Pat. No. 4,064,953, also used radial shear pins, but in combination with a structure that enables limited rotation of a drilling string to keep the separated sections together for withdrawal from the well.

An alternative breakaway structure for tubing strings was disclosed in U.S. Pat. No. 3,387,863 to R. Treese. A pair of grooves was cut into a pipe section, one of which is sufficiently thin to fracture upon axial tension in excess of a predetermined level. A mating ring having flanges to fit the grooves is held in place by a collar. This structure is thereby able to withstand compressive forces while still failing under tensile forces.

In fuel delivery systems, breakaway couplings were provided with valve mechanisms to prevent spillage of fluid under pressure when the coupling separated. Releasable couplings, such as were shown in the patents to Nitzberg et al, Nos. 4,779,638 and 4,800,913, include a spring loaded detent structure that fits in a groove of and joins the members together. The detent member or the wall against which it bears has a slope that acts to cam the detent out of the way when the axial tensile forces exceed a predetermined level. The Nitzberg et al patents also show frangible versions which utilize shear pins.

Other prior art patents show various combinations employing shear pins or studs. Typical are the patents to Vernor et al, No. 4,449,545; Robertson, No. 4,483,359; Bormioli, No. 4,652,016; and the U.K. Application No. GB 2 051 993 to Gall Thomson Maritime Limited. A variation using radial shear pins on a coupling plate was disclosed in the Canadian patent to Fairles, No. 814,290.

BRIEF SUMMARY OF THE INVENTION

What has been need and what is supplied by the present invention is a breakaway coupling device that permits a controlled separation of the hose under predetermined conditions of tension or strain on the hose, such as would be experienced by the moving of the truck or aircraft before the hose was disengaged from the aircraft.

A special coupling device is inserted into the hose intermediate the ends and held in place, either by clamps or by other well known anchoring techniques. It is necessary that the device withstand pressures of the fluid during the normal fluid transfer process as well as the stresses and strains of normal operation. However, at a predetermined level of strain or tension, the coupling should part cleanly, leaving the fittings intact.

According to the present invention, a pair of telescoping connector elements are provided, each with an end that can engage a free end of a hose segment. The hose ends are fastened to the connector ends, either with clamps or with teeth that engage the hose. The connector includes a male element and a female element.

The male element is conveniently provided with a groove in which an O-ring can be seated to make the coupling fluid tight. A second groove is provided to retain a frangible coupling link. The coupling link is a split ring with a flange that extends radially. When installed on the male element, the height of the ring and the flange is slightly greater than the inside diameter of the female coupling element.

The female coupling element has a groove on the inner surface to receive the flange of the split ring. The split ring is "compressed" into the groove of the male element until the female element can telescope over it. When the flange reaches the groove on the inner surface of the female element, the elasticity of the ring causes it to expand, engaging the flange in the groove of the female element, locking the elements together.

The flange is designed to fail at a predetermined axial pull. This can be accomplished in several ways. According to a preferred embodiment of the present invention, the flange is cut into a series of separated tabs. Alternatively, the flange can be undercut where it extends from the ring. It is also possible to design the flange so that its cross section is sufficiently thin to collapse at the predetermined stress.

When the strain on the hose exceeds the failure level of the coupling, in the preferred embodiment, the flange tabs shear off and the connector separates into its two parts. To restore the coupling, a new coupling ring is placed into the groove on the male connector and compressed. The elements are telescoped together and when the flange on the ring reaches the groove in the inner surface of the female element, the ring expands, seating the flange into the retaining groove on the inner surface. The O-ring prevents any fluid leakage through the coupling element.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference numerals refer to like parts throughout and in which:

FIG. 7 is an end view of a coupling ring according to an alternative embodiment of the invention; and FIG. 8 is a side sectional view of the ring of FIG. 7, above taken along line 8—8 in the direction of the appended arrows.

DETAILED DESCRIPTION OF THE DRAWINGS

Figure 1:
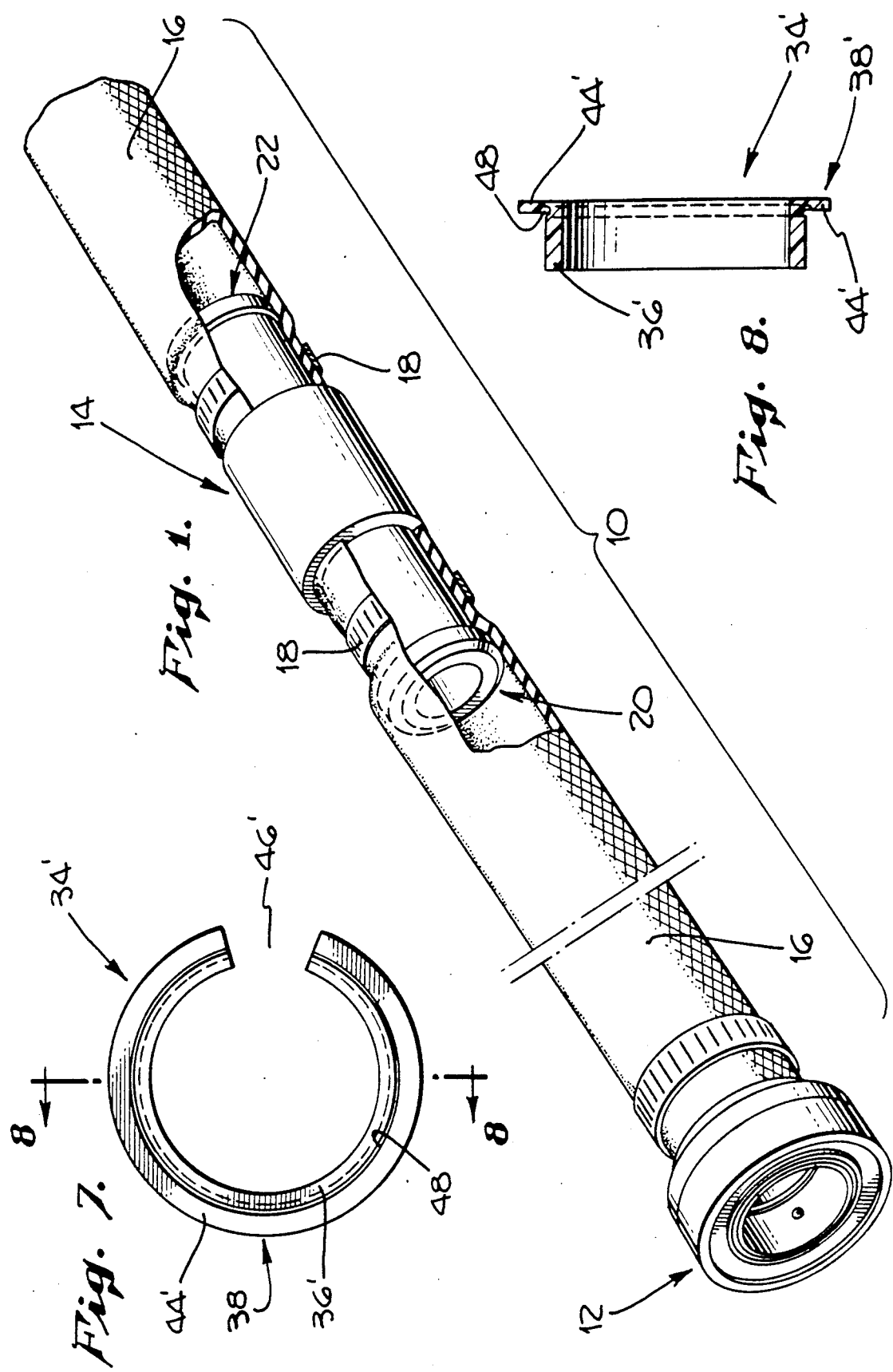
FIG. 1 is a perspective view of a hose containing a breakaway coupling according to the present invention.

Turning first to FIG. 1, there is shown a portion of a servicing hose 10 which is adapted to supply rinsing fluid under pressure to the waste system of an aircraft. At one end, there is a coupling member that fits onto a pumped fluid outlet of a servicing vehicle. The other end contains a specialized fitting 12 that attaches to an intake port on the aircraft that is recessed behind an access panel.

In some embodiments (not shown), the specialized fitting may include an elbow or other angled portion to allow access to an area that might not underlie the access hatch. One problem that has arisen when a vehicle has attempted to move away without disconnecting the specialized fitting, is that as the fitting shears off the attachment point on the aircraft, the aircraft skin may be torn away, as well, as the specialized fitting is pulled through the access panel.

To enable a clean, easy parting of the hose, a breakaway coupling 14 according to the present invention is inserted into the hose line near the access panel of the aircraft. The location is chosen to assure that any pull on the hose from relative motion of the vehicles will be strictly in the axial direction. As shown, the coupling 14 is clamped to the hose 16 at each of its ends with hose clamps 18.

Figure 2:
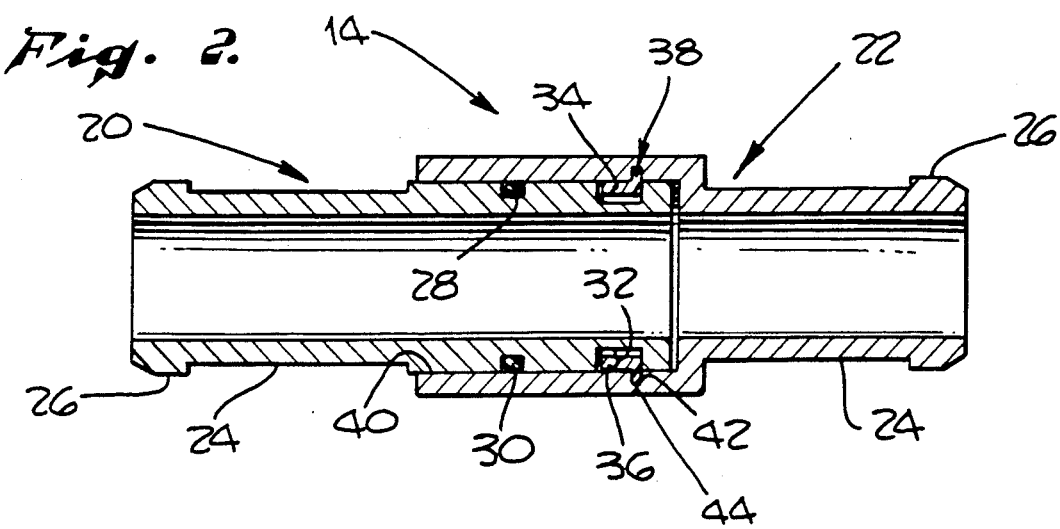
FIG. 2 is a side sectional view of an assembled breakaway coupling according to the present invention.

The interconnected coupling 14 can be seen in better detail in FIG. 2. The coupling 14 includes a male element 20 and a female element 22. Both include an extended portion 24 with an integral holding rib 26 that is inserted into the hose 16. The hose clamps 18 (of FIG. 1) are positioned to hold the hose over the extended portion 24, reducing the diameter sufficiently so that the hose is locked against the ribs 26.

The male element 20 includes a first groove 28 into which is fitted an o-ring 30 to provide a fluid tight seal when the male and female elements are telescoped together. The male element 20 also includes a second annular groove 32 into which is fitted a coupling ring 34 (better seen in FIGS. 5 and 6, below). The coupling ring 34 includes a circumferential body portion 36 and a radially extending flange portion 38.

The female element 22 has on its inner circumference 40 a coupling groove 42 that is adapted to receive the radially extending flange portion 38 of the coupling ring 34. As shown, the flange portion 38 is capable of shearing from the body portion 36 when the axial forces in opposite directions exceed a predetermined threshold.

Figure 3:
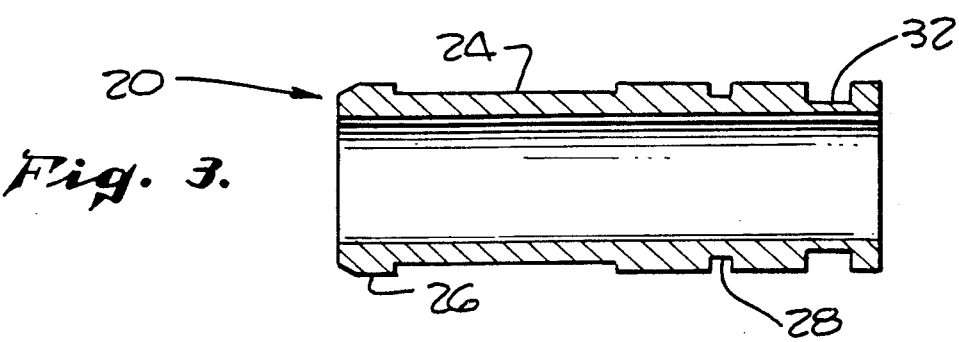
FIG. 3 is a side sectional view of a male coupling member according a preferred embodiment of the present invention.
Figure 4:
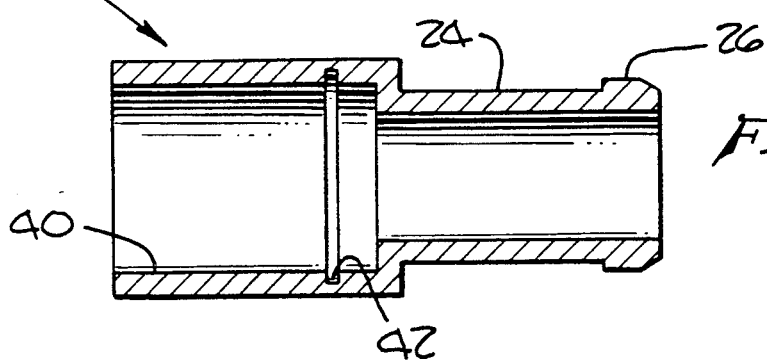
FIG. 4 is a side section view of a female coupling member according to the present invention.

For a better understanding of the structure of the male and female elements 20, 22, FIGS. 3 and 4 are provided, respectively. Illustrated therein are the individual male and female elements 20, 22, respectively. As seen, the preferred embodiment includes a relatively deep groove 32 for the coupling ring 34. This is to permit the ring 34, which is split (as better seen in FIGS. 5 and 6) to better fit into the groove 32 when the ring 34 is compressed so that the flange portions 38 will clear the inner circumference 40 of the female portion 22 when the male portion 20 is inserted into the female portion 22. When the flange portions 38 reach the coupling groove 42, the elasticity of the coupling ring 34 allows the ring to expand, seating the flange portions 38 in the coupling groove 42.

Figure 6:
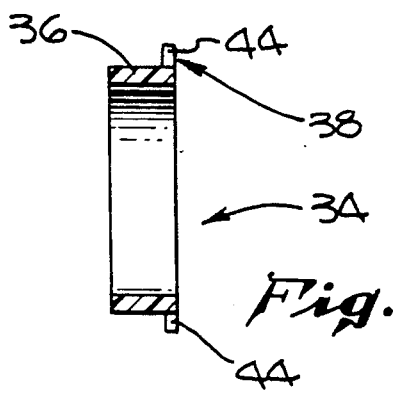
FIG. 6 is a side sectional view of the ring of FIG. 5, above taken along line 6—6 in the direction of the appended arrows.
Figure 5:
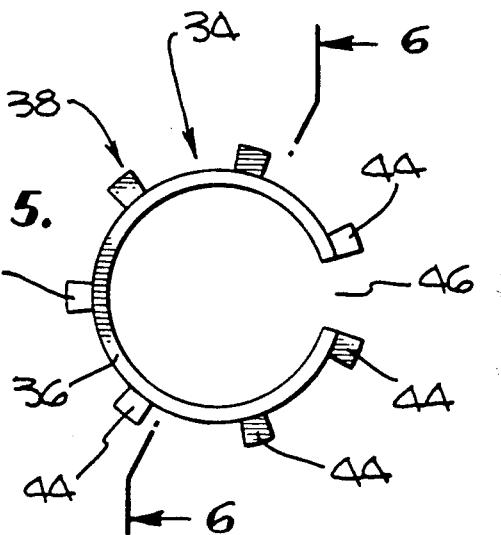
FIG. 5 is an end view of a coupling ring according to a preferred embodiment of the invention.

Turning next to FIGS. 5 and 6, there is shown in end and side sectional views, respectively, a preferred embodiment of a coupling ring 34 according to the present invention. In the preferred embodiment, the radial extending flange portions 38 comprise a plurality of individual radial tabs 44. A gap 46 is provided, splitting the ring 34 so that the overall diameter of the ring 34 can be reduced when assembling the coupling 14.

The force necessary to break or shear the tabs 44 from the body of the ring 34 is a function of the thickness of the tabs 44 at their junction with the body portion 36 and the number of tabs 44, overall. By varying the number or thickness of the tabs 44, the force required to shear the tabs 44 will be changed accordingly.

In FIGS. 7 and 8, an alternative embodiment of a coupling ring 34' is shown in which a continuous radial flange 44' is used as the radial flange portion 38. A parting groove 48 is engraved at the junction of the flange 44' and the body portion 36', thereby weakening the junction. The depth of the parting groove 48 determines the force necessary to shear off the flange 44'.

Thus there has been shown a novel breakaway connector which includes male and female portions that are locked together by the radial flange portion of a frangible coupling ring. When oppositely directed forces on the male and female portions exceed a predetermined value, the radial flange portion shears away from the remainder of the coupling ring and the coupling separates, protecting the structures which are connected to the remote ends of the hose or other conduit into which the connector is inserted.

Other modifications and embodiments will appear to those skilled in the art in accordance with the teachings set forth herein and therefore, the invention should be limited only by the scope of the claims appended hereto.

What is claimed as new is:

1. A breakaway coupling for a fluid delivery conduit comprising:
   (a) a first coupling element having a conduit receiving portion and a first interconnecting portion;
   (b) a second coupling element having a conduit receiving portion and a second interconnecting portion, adapted to telescopically engage said first interconnecting portion;
   (c) sealing means retained in a groove n one of said interconnecting portions and adapted to form a fluid tight seal with the other of said interconnecting portions; and
   (d) radially flexible, frangible connecting and locking means including a first element for engaging a groove in one of said interconnecting portions and a breakable flange element for engaging a groove in the other of said interconnecting portions, said connecting and locking means adapted to be radially yieldable to permit said first and second coupling elements to telescopically engage one another overriding said connecting and locking means until said grooves of said coupling elements are aligned with said connecting and locking means first element and flange element, respectively,
   whereby said flange element is the sole element preventing the separation of the coupling elements and is intended to break if a predetermined pull in a direction non parallel to said flange element is exceeded, thereby releasing said interconnected coupling elements.

2. The breakaway coupling of claim 1, above, wherein said flange element comprises a plurality of individual tabs.

3. The breakaway coupling of claim 1, above, wherein a substantial parting groove is made at the joinder of the flange portion to said frangible means first element to reduce the thickness of the material at the joinder.

4. The breakaway coupling of claim 1, above, wherein said frangible means are made of a plastic material.

5. The breakaway coupling of claim 1, above, wherein said frangible means are made of a metal.

6. The breakaway coupling of claim 1, above, further including clamping means for holding said conduit receiving portions sealingly fastened to the conduit.

* * * * *